United States Patent Office 3,702,867
Patented Nov. 14, 1972

3,702,867
4-AMINOMETHYL
Shigeharu Kohno, Tatsuo Komaki, and Hideaki Watanabe, Tokyo, Japan, assignors to Eisai Co., Ltd., Tokyo, Japan
No Drawing. Filed Nov. 13, 1970, Ser. No. 89,478
Int. Cl. C07c 101/04
U.S. Cl. 260—514 R
2 Claims

ABSTRACT OF THE DISCLOSURE 4-aminomethyldecaline-1-carboxylic acid, a new compound, and pharmacologically acceptable salts thereof prepared by catalytical hydrogenation of 4-substituted-naphthaline-1-carboxylic acid or functional derivatives thereof and, if necessary, subjecting the hydrogenated product to hydrolysis to form the corresponding carboxylic acid. The said carboxylic acid possesses outstanding anti-plasmin effect with low toxicity. The products are suitable for prevention or therapeutical treatment of inflammatory and hemorrhagic diseases such as purpura, hemophila, nephrorrhagy and gential hemorrhage caused by plasmin.

---

This invention pertains to 4-aminomethyldecaline-1-carboxylic acid, a new compound, and preparation thereof.

It has surprisingly been found that 4-aminomethyldecaline-1-carboxylic acid represented by the formula

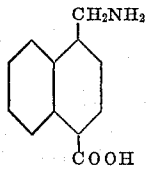

exhibits outstanding anti-plasmin activity with low toxicity. The compound therefore is useful for prevention or therapeutuical treatment of inflammatory and hemorrhagic diseases such as purpura, hemophila, nephororrhagy and genital hemorrhage caused by plasmin.

Anti-plasmin activity of the above-specified compound of the present invention was determined in vitro by the following tests.

In the tests, 4-aminomethyldecaline-1-carboxylic acid hydrochloride hereinafter called "Compound A" was employed in comparison with tranexamic acid hydrochloride [trans-4-(aminomethyl)cyclohexane-carboxylic acid hydrochloride], as control hereinafter called "Compound B" which has widely been used as anti-plasmin drug in clinical field.

(1) Determination of anti-fibrinogenolic activity

Each 0.5 ml. of six aqueous solutions containing respectively 1, 2, 3, 4, 5 and 6 millimols per liter of Compound A and six equivalent solutions of Compound B was respectively added to each of a mixture consisting of 0.5 ml. plasmin (5 casein equivalent units/ml.) and 2.5 ml. of a 2 percent aqueous solution of fibrinogen.

The mixtures were allowed to stand for one hour at 37° C., and then added thereinto respectively 2.5 ml. of trichloroacetic acid in the concentration of 0.44 mol/l. The mixtures were again allowed to stand for 30 minutes.

Photo-absorptions of these mixtures were measured in a light of 275 mμ wave length. In these experiments, diminution of the photo-absorbability is denoted as a measure of inhibition activity of the compounds under test toward decomposition of the fibrinogen, that is, the anti-plasmin effect of the compounds.

The resulting anti-fibrinolytic activity (percent) of Compound A and Compound B were tabulated in Table I.

TABLE I
Anti-fibrinolytic activity

| Quantity (m.mol) of compounds added | Anti-fibrinolytic activity of Compound A | Anti-fibrinolytic activity of Compound B (control) |
|---|---|---|
| 1 | 10.3 | 9.7 |
| 2 | 15.1 | 12.6 |
| 3 | 23.2 | 18.4 |
| 4 | 41.2 | 18.7 |
| 5 | 66.0 | 19.0 |
| 6 | 96.3 | 20.5 |

From the data in the table, it is appreciated that the Compound A shows a considerably marked inhibition activity toward the fibrinolytic effect caused by plasmin as compared with that of Compound B.

(2) Anti-caseinolytic activity

A series of experiments were carried out in the manner same as the foregoing experiments with exception that the 2% fibrinogen solution was substituted by the equivalent amount of a 2% casein solution.

The results obtained are tabulated in Table II.

TABLE II
Anti-caseinolytic activity

| Quantity (m.mol) of compounds added | Anti-caseinolytic activity of Compound A | Anti-caseinolytic activity of Compound B (control) |
|---|---|---|
| 1 | 20.0 | 2.5 |
| 2 | 35.6 | 3.7 |
| 3 | 52.5 | 5.2 |
| 4 | 65.7 | 17.0 |
| 5 | 72.3 | 35.1 |
| 6 | 76.5 | 41.2 |

From the data in the table, it is appreciated that Compound A shows a marked inhibition activity toward caseinolytic effect caused by plasmin as compared with that of Compound B.

In animal test, it was found that the specified Compound A has a considerably low acute toxicity. $LD_{50}$ toxicity of the compound on mice was as follows:

Administration: $LD_{50}$ (g./kg.)
 Oral administration _____ >8.0
 Subcutaneous injection _____ >7.2
 Intraperitoneal injection _____ >3.2
 Intravenous injection _____ >2.1

The process for the preparation of 4-aminomethyl-decaline-1-carboxylic acid in accordance with the present invention is schematically represented by the following equation:

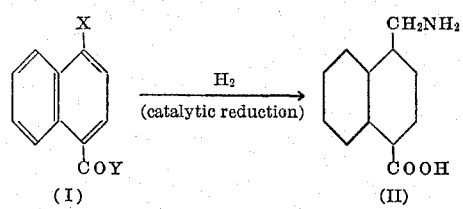

wherein X is $-CH_2NH_2$, $-CN$ or $-CH_2NH$-acyl which is easily hydrolysable to convert into $-CH_2NH_2$, and Y is $-OH$ or a radical such as $-O$-alkyl and $-NH_2$ which also is easily convertible into $-OH$ when hydrolised.

More specifically, 4-substituted naphthaline-1-carboxylic acid or its derivatives represented by the formula is subjected to catalytic hydrogenation and, if necessary, the hydrogenated product thus obtained is further hydrolysed to obtain the intended 4-aminomethyldecaline-1-carboxylic acid (II). The resulting compound, if desired, may further be converted into salts of pharmacologically acceptable acids.

As catalyst preferable for the performance of the aforementioned hydrogenation reaction, there is mentioned rhodium-platinum, Raney nickel, platinum oxide and ruthenium catalysts.

Use of an initial hydrogen pressure higher than 150 kg./cm.$^2$ will advantageously prevent a formation of undesired by-products such as partially or insufficiently hydrogenated compounds.

Although glacial acetic acid or acetic anhydride may be used as reaction medium, that is, solvent for the reaction, there may also be used lower aliphatic alcohols such as methanol, ethanol, propanol etc., when the substituent X in the Formula I as the starting material is $-CH_2NH_2$ or $-CH_2NH$-acyl group.

For therapeutical purposes, the compound aimed at in the present invention may be used in a form of tablets, granulates, powder and aqueous solutions.

The following examples serve to illustrate the invention.

EXAMPLE 1

Preparation of 4-aminomethyldecaline-1-carboxylic acid from 4-cyanonaphthaline-1-carboxylic acid 2.0 grams of 4-cyanonaphthaline-1-carboxylic acid, 70 ml. of acetic anhydride and an appropriate amount of rhodium-platinum catalyst were charged in a 150 ml. capacity autoclave made of stainless steel which was mounted on a reciprocating platform.

Hydrogenation of the content of the autoclave was continued at 100° C. with hydrogen under initial pressure of 180 kg./cm.$^2$ for eight hours with shaking.

When the hydrogenation was completed, the residual pressure in the autoclave was released and the reaction product recovered was filtered to remove the spent catalyst. The filtrate after once treated with active carbon was evaporated up to dryness.

To the dry residue was added 25 ml. of concentrated hydrochloric acid and the mixture is then heated for 5 hours and allowed to stand. The crystalline substance separated out was recovered by filtration, dried in air at ambient temperature and finally recrystallized from ethanol. There was obtained the crystalline hydrochloride having the melting point of 260°–262° C. Yield was 0.5 gram.

Elementary analysis of the product gave:

|  | C | H | N |
|---|---|---|---|
| Calculated as $C_{21}H_{21}NO_2 \cdot HCl$ (percent) | 58.20 | 8.96 | 5.66 |
| Found (percent) | 58.37 | 9.10 | 5.68 |

EXAMPLE 2

Preparation of 4-aminomethyldecaline-1-carboxylic acid from 4-aminomethylnaphthaline-1-carboxylic acid amide 3.2 grams of 4-aminomethylnaphthaline-1-carboxylic acid amide, 70 ml. of isopropanol and an appropriate amount of Raney nickel catalyst were charged in the same autoclave as that employed in the preceding example.

Hydrogenation of the content of the autoclave was conducted at an initial hydrogen pressure of 200 kg./cm.$^2$ and at temperatures of 150° C. for 5 hours.

After completion of the hydrogenation reaction, the residual pressure was released from the autoclave and the reaction mixture recovered was filtered to remove the spent catalyst. The filtrate after once treated with active carbon was made alkaline with an aqueous solution of sodium hydroxide. An oily substance separated out was extracted with ether, and the ethereal extract was washed with water and dried on anhydrous potassium carbonate.

To the residue remained by distilling out of the ether was added an amount of concentrated hydrochloric acid and the whole was allowed to stand. A crystalline substance was recovered by filtration, dried in air at ambient temperature and was then recrystallized from methanol-ether mixture. There was obtained the intended substance as its hydrochloride melting at 261°–262° C. Yield was 0.7 gram. No appreciable depression of the melting point was observed when the product was mixed with the purified product of Example 1.

EXAMPLE 3

Preparation of 4-aminomethyldecaline-1-carboxylic acid from 4-cyanonaphthaline-1-carboxylic acid methyl ester 2.0 grams of 4-cyanonaphthaline-1-carboxylic acid methyl ester and 50 ml. of acetic anhydride were introduced together with a proper amount of platinum oxide catalyst to an autoclave similar to that employed in the preceding example. The autoclave was externally heated to 180° C. with shaking under initial hydrogen pressure of 170 kg./cm.$^2$ for 4 hours. The reaction product thus obtained was further worked up in accordance with the procedure given in Example 1. 0.7 gram of the intended product having melting point of 260°–262° C. was obtained in a form of its hydrochloride.

EXAMPLE 4

Preparation of tablets 200 grams of 4-aminomethyldecaline-1-carboxylic acid hydrochloride and 2,000 grams of lactose were thoroughly mixed together and the whole was passed through a 30 mesh sieve.

A paste was separately prepared with 80 grams of cornstarch and 350 ml. of distilled water.

The above mixture was well kneaded with the paste and the mass was passed through a 4 mesh sieve and the resulting gloubles were dried at 50° C. for 15 hours.

The dried globules were then granulated first on a granulating machine and then passed through a 16 mesh sieve. The grains were covered with a powdery mixture which had been prepared by blending 30 grams of calcium stearate, 200 grams of cornstarch and 80 grams of talc, and then passed through a 40 mesh sieve.

Tablets each containing 50 mg. of 4-aminomethyldecaline-1-carboxylic acid hydrochloride were made of the above-obtained granules in accordance with the conventional procedure known in the art.

Two or three tablets may be dosed 2–3 times per day.

EXAMPLE 5

Preparation of injection 100 grams of 4-aminomethyldecaline-1-carboxylic acid hydrochloride were dissolved in a quantity of distilled water specifically prepared for this purpose and made up to 5 liters. The solution was made isotonic with addition of a predetermined amount of an aqueous solution physiological salt and filtered through a glass filter.

Each 5 ml. fraction of the filtered solution was filled in ampoules and sealed. The ampoules were sterilized at 121° C. for 25 minutes in an autoclave at 15 lbs./in.$^2$, followed by immediate dipping in a cold water bath.

The ampoules are ready for therapeutical use. 1–2 ampoules per day dose by intravenous injection are advisable.

EXAMPLE 6

Preparation of an aqueous solution for oral administration

A mixture consisting of:

| | | |
|---|---|---|
| 4-aminomethyldecaline-1-carboxylic acid hydrochloride | grs | 20.0 |
| Cane sugar | grs | 100.0 |
| Glycerine | ml | 100.0 |
| Ethyl p-oxybenzoate | grs | 1.5 |
| Artificial orange essence | ml | 0.2 |
| Essential oil of orange | ml | 1.0 | was added to distilled water to make up 1000 ml. of the final volume.

Before use, the solution should thoroughly be shaken. A 2–4 teaspoonful quantity of the solution per day dose is advisable.

What we claim is:

1. 4-aminomethyldecaline-1-carboxylic acid of the formula

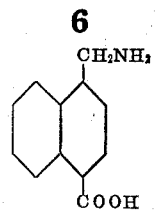

2. 4-aminomethyldecaline-1-carboxylic acid hydrochloride.

References Cited

FOREIGN PATENTS 14,209   6/1968   Japan _____ 260—514

LORRAINE A. WEINBERG, Primary Examiner

R. GERSTL, Assistant Examiner

U.S. Cl. X.R.

260—465 D, 468 F, 471 R, 518 R; 424—319